Patented Aug. 22, 1939

2,170,453

UNITED STATES PATENT OFFICE 2,170,453

VULCANIZATION OF RUBBER

Marion W. Harman, Nitro, W. Va., assignor to Monsanto Chemical Company, St. Louis, Mo., a corporation of Delaware No Drawing. Application August 26, 1936, Serial No. 98,069

4 Claims. (Cl. 18—53)

The present invention relates to new vulcanization accelerators, to a process of vulcanizing rubber and to the vulcanization product obtained with the aid of the said new vulcanization accelerators.

The new and preferred accelerators comprises reaction products obtainable by reacting a salt of piperidyl dithiocarbamic acid, as for example an amine salt or an alkali metal salt and preferably the sodium salt thereof, with a phthalyl chloride. More particularly the preferred accelerator of the present invention comprises phthalyl bis-dipiperidyl-dithiocarbamate believed to possess the structural formula of

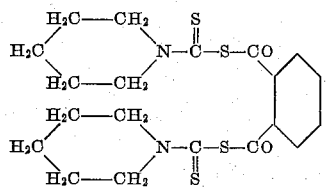

The present invention, however, is not limited as to any specific formula of the preferred accelerators. Phthalyl halides, as for example phthalyl chloride, exist in a tautomeric form possessing, it is believed, the structure of

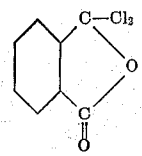

and the present invention includes within its scope the use as an accelerator of the condensation products of salts, for example, alkali metal salts and amine salts of piperidyl dithiocarbamic acid with said tautomers.

As one method of preparing the accelerators of the present invention substantially 0.2 mol of 90% piperidine (19.0 parts by weight) were added to an aqueous solution of substantially 0.2 mol of sodium hydroxide (8.0 parts by weight) dissolved in a convenient quantity of water and substantially 0.2 mol of carbon disulfide (15.2 parts by weight) added thereto at room temperature with rapid agitation. To the aqueous solution of the sodium salt of piperidyl dithiocarbamic acid prepared as above described substantially 0.1 mol of phthalyl chloride having a purity of 95.6% (21.2 parts by weight) dissolved in a convenient quantity of an inert volatile organic solvent, immiscible with water, for example substantially 15 to 25 parts by weight of benzene, was added slowly thereto at a temperature below room temperature and preferably at a temperature of substantially 5° C. to 15° C. The product thus formed comprising an oily mass was separated from the aqueous solution, dissolved in a convenient solvent, for example benzene, and the solution washed first with a dilute alkaline solution, then with water, dried over a desiccating agent, for example anhydrous calcium chloride, and the solvent removed therefrom by a convenient method, as for example by evaporation. The residual product so obtained was incorporated in a typical gum stock comprising

| | Parts |
|---|---|
| Pale crepe rubber | 100 |
| Zinc oxide | 5 |
| Sulfur | 3 |
| Stearic acid | 1 |
| Phthalyl bis-dipiperidyl dithiocarbamate | 1 |

The stock so compounded was vulcanized by heating in a press for thirty minutes at the temperature of thirty pounds of steam pressure per square inch. The following tensile and modulus data were obtained on the vulcanized rubber product.

| Cure | | Modulus of elasticity in lbs./in.² at elongations of— | | | Tensile at break in lbs./in.² | Ult. elong., percent |
|---|---|---|---|---|---|---|
| Time, mins. | Lbs. steam pressure | 300% | 500% | 700% | | |
| 30 | 30 | 354 | 973 | 4130 | 4130 | 700 |

An examination of the test data above shows the preferred material to be exceptionally strong and fast in its accelerating properties.

Phthalyl bis-dipiperidyldithiocarbamate has also been employed in a tread stock. Thus, a rubber stock was compounded comprising

| | Parts |
|---|---|
| Smoked sheet rubber | 100 |
| Carbon black | 50 |
| Zinc oxide | 5 |
| Sulfur | 3 |
| Stearic acid | 3 |
| Pine tar | 2 |
| Phthalyl bis-dipiperidyldithiocarbamate | 0.5 |

The rubber stock so compounded was vulcanized by heating in a press in the well-known manner and the cured rubber product found on testing to possess the following modulus and tensile properties.

| Cure | | Modulus of elasticity in lbs./in.² at elongations of— | | Tensile at break in lbs./in.² | Ult. elong., percent |
|---|---|---|---|---|---|
| Time, mins. | Lbs. steam pressure | 300% | 500% | | |
| 60 | 30 | 1585 | 3400 | 3760 | 530 |

It is thus shown that the preferred product also possesses strong accelerating properties when employed in relatively small amounts in a typical tread stock.

Further, other methods of preparing the preferred accelerators than that described above may be employed. Thus, the piperidine salt of piperidyl dithiocarbamic acid may be reacted with phthalyl chloride according to the method of Braun and Kaiser, Berichte der deutschen Chemischen Gesellschaft, vol. 55, pages 1307–1308 (1922). Further other inert organic solvents than benzene may be employed in the manufacture of the preferred products.

The accelerators of the present invention may be employed in amounts different from those shown and with other compounding ingredients and in varying types of rubber stocks. Further, the preferred accelerators may be employed in conjunction with other well-known accelerators as for example basic organic nitrogen containing accelerators, such as diphenyl guanidine, di ortho tolyl guanidine, aldehyde amine accelerators and the like. Furthermore, the preferred accelerators may, if desired, be employed in conjunction with guanidine salts, such as for example diphenyl guanidine phthalate, diphenyl guanidine acetate, diphenyl guanidine oxalate, di ortho tolyl guanidine phthalate and the like.

The term "rubber" is employed in the claims in a generic sense to include caoutchouc, whether natural or synthetic, latex whether coagulated or uncoagulated, reclaimed rubber, balata, gutta percha, rubber isomers and like products.

The present invention is limited solely by the claims attached hereto as part of the present specification.

What is claimed is:

1. A process of vulcanizing rubber which comprises heating rubber and sulfur in the presence of a vulcanization accelerator possessing the structural formula of

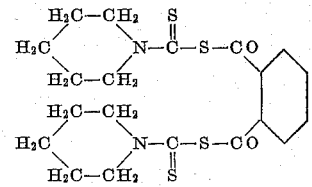

2. A process of vulcanizing rubber which comprises heating rubber and sulfur in the presence of a phthalyl bis-dipiperidyl-dithiocarbamate.

3. The vulcanized rubber product produced by heating rubber and sulfur in the presence of a vulcanization accelerator possessing the structural formula of

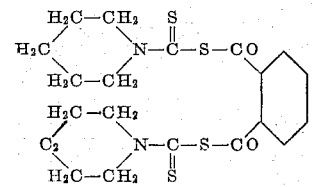

4. The vulcanized rubber product produced by heating rubber and sulfur in the presence of a phthalyl bis-dipiperidyl-dithiocarbamate.

MARION W. HARMAN.